US010613772B2

(12) United States Patent
Reddy et al.

(10) Patent No.: US 10,613,772 B2
(45) Date of Patent: Apr. 7, 2020

(54) METHODS AND APPARATUSES FOR COPYING A DATA PAGE IN AN UNMANAGED FLASH MEMORY DEVICE

(71) Applicant: QUALCOMM Incorporated, San Diego, CA (US)

(72) Inventors: Nikhilesh Reddy, Pittsburgh, PA (US); Benish Babu, San Diego, CA (US); Richard Patrick, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 246 days.

(21) Appl. No.: 15/461,470

(22) Filed: Mar. 16, 2017

(65) Prior Publication Data
US 2018/0267721 A1 Sep. 20, 2018

(51) Int. Cl.
G06F 12/00 (2006.01)
G06F 3/06 (2006.01)
G06F 13/16 (2006.01)

(52) U.S. Cl.
CPC .......... G06F 3/0619 (2013.01); G06F 3/065 (2013.01); G06F 3/0659 (2013.01); G06F 3/0679 (2013.01); G06F 13/1673 (2013.01); Y02D 10/14 (2018.01)

(58) Field of Classification Search
CPC ...... G06F 3/0619; G06F 3/065; G06F 3/0659; G06F 3/0679; G06F 13/1673; Y02D 10/14
See application file for complete search history.

(56) References Cited

U.S. PATENT DOCUMENTS

| | | | |
|---|---|---|---|
| 7,334,080 B2* | 2/2008 | Takase | G06F 12/0246 711/103 |
| 8,443,263 B2 | 5/2013 | Selinger et al. | |
| 8,537,618 B2 | 9/2013 | Grossman et al. | |
| 8,612,665 B2 | 12/2013 | Jeon et al. | |
| 9,170,744 B1 | 10/2015 | Smith | |
| 9,448,743 B2 | 9/2016 | Prins et al. | |
| 9,921,954 B1* | 3/2018 | Sabbag | G06F 12/0246 |
| 2007/0237007 A1* | 10/2007 | Muraoka | G06F 11/1068 365/189.05 |
| 2008/0250195 A1* | 10/2008 | Chow | G06F 12/0246 711/103 |
| 2009/0113119 A1* | 4/2009 | Oribe | G06F 12/0804 711/103 |

(Continued)

OTHER PUBLICATIONS

International Search Report and Written Opinion—PCT/US2018/016582—ISA/EPO—dated Feb. 27, 2019.

*Primary Examiner* — Prasith Thammavong
(74) *Attorney, Agent, or Firm* — Muncy, Geissler, Olds & Lowe, P.C.

(57) ABSTRACT

The present disclosure provides methods for copying a data page in a flash memory device using a flash memory controller. A method may comprise receiving, at the host flash controller, a copy command from a host processor, in response to the copy command, transmitting a read command to the unmanaged flash memory storage device via a bus, wherein the read command indicates particular data, receiving the particular data from the unmanaged flash memory storage device via the bus, storing the particular data in a data buffer included in the host flash controller, and transmitting to the unmanaged flash memory storage device, via the bus, a write command to write the particular data.

30 Claims, 5 Drawing Sheets

(56) References Cited

U.S. PATENT DOCUMENTS

| | | | |
|---|---|---|---|
| 2011/0040924 A1* | 2/2011 | Selinger | G06F 11/10 711/103 |
| 2011/0041005 A1* | 2/2011 | Selinger | G06F 11/10 714/719 |
| 2011/0041039 A1* | 2/2011 | Harari | G06F 11/1068 714/773 |
| 2011/0093646 A1* | 4/2011 | Koka | G06F 12/0817 711/103 |
| 2011/0161784 A1* | 6/2011 | Selinger | G06F 11/1068 714/768 |
| 2011/0173326 A1* | 7/2011 | Lambert | G06F 9/5061 709/226 |
| 2012/0005441 A1* | 1/2012 | Tomita | G06F 16/10 711/162 |
| 2012/0151124 A1* | 6/2012 | Baek | G06F 12/0246 711/103 |
| 2013/0145076 A1 | 6/2013 | Chiueh et al. | |
| 2014/0063955 A1* | 3/2014 | Kawase | G06F 11/1048 365/185.12 |
| 2014/0215129 A1 | 7/2014 | Kuzmin et al. | |
| 2014/0372670 A1* | 12/2014 | Vasilyuk | G06F 12/0246 711/103 |
| 2016/0077959 A1* | 3/2016 | Quach | G06F 12/0246 711/102 |
| 2016/0119443 A1* | 4/2016 | Susarla | H04L 67/2842 709/213 |
| 2016/0284390 A1 | 9/2016 | Tomishima et al. | |
| 2018/0004688 A1* | 1/2018 | Chung | G11C 11/4093 |
| 2018/0018123 A1* | 1/2018 | Shah | G06F 12/08 |
| 2019/0042146 A1* | 2/2019 | Wysoczanski | G06F 3/0656 |
| 2019/0303603 A1* | 10/2019 | Courtney | G06F 3/067 |

\* cited by examiner

METHODS AND APPARATUSES FOR COPYING A DATA PAGE IN AN UNMANAGED FLASH MEMORY DEVICE

INTRODUCTION

Aspects of this disclosure relate generally to integrated circuit devices, and more particularly to methods and apparatuses for copying a data page in an unmanaged flash memory device.

Flash memory devices include an array of gates, for example, NOR logic gates and/or NAND logic gates. A data page may include a plurality of gates, and a data block may include a plurality of data pages.

The flash memory device requires a flash memory controller to perform data operations. In some implementations, the flash memory controller is incorporated into the flash memory device ("managed" flash). In other implementations, the flash memory controller is incorporated into a host device ("unmanaged" flash). The host device may be configured to receive the unmanaged flash memory device in a data port via a bus. In some examples, the bus may be a serial bus, and the host device may communicate with the unmanaged flash memory device via the bus and protocols such as Serial Peripheral Interface bus (SPI), Inter-Integrated Circuit (I2C), Peripheral Component Interconnect Express (PCIe), etc. In some examples, the protocols may be embedded MultiMediaCard (eMMC), Universal Flash Storage (UFS), or M-PHY.

In a conventional unmanaged flash memory device, erasure cannot be selectively performed on an individual data page. Instead, erasure must be performed on an entire data block (including a plurality of data pages). It will be understood that efficient use of space in a flash memory device requires frequent erasure of invalid or obsolete data.

However, it is necessary to preserve valid data when performing an erasure. To preserve valid data in an unmanaged flash device, a host processor in the host device will instruct the flash memory controller to read the valid data. The valid data will then be read to host memory in the host device. After the read is complete, the host processor will instruct the flash memory controller to write the valid data from the host memory to the unmanaged flash device.

SUMMARY

The following summary is an overview provided solely to aid in the description of various aspects of the disclosure and is provided solely for illustration of the aspects and not limitation thereof.

As data use increases, the number of erasures that must be performed also increases. Using conventional techniques, each erasure requires multiple instructions from the host processor. Given the large number of erasures, any reduction in the processing power or time required to complete a single erasure may greatly improve performance of the host device.

In one example, a method for copying data in an unmanaged flash memory storage device using a host flash controller is disclosed. The method may include, for example, receiving, at the host flash controller, a copy command from a host processor, in response to the copy command, transmitting a read command to the unmanaged flash memory storage device via a bus, wherein the read command indicates particular data, receiving the particular data from the unmanaged flash memory storage device via the bus, storing the particular data in a data buffer included in the host flash controller, and transmitting to the unmanaged flash memory storage device, via the bus, a write command to write the particular data.

In another example, a host flash controller is disclosed. The host flash controller may include, for example, a flash memory controller data buffer, and a flash memory controller unit coupled to the flash memory controller data buffer, wherein the flash memory controller unit is configured to receive, at the host flash controller, a copy command from a host processor, in response to the copy command, transmit a read command to an unmanaged flash memory storage device via a bus, wherein the read command indicates particular data, receive the particular data from the unmanaged flash memory storage device via the bus, store the particular data in a data buffer included in the host flash controller, and transmit to the unmanaged flash memory storage device, via the bus, a write command to write the particular data.

In yet another example, a flash memory controller apparatus is disclosed. The flash memory controller apparatus may include, for example, means for receiving, at a host flash controller, a copy command from a host processor, means for transmitting, in response to the copy command, a read command to the unmanaged flash memory storage device via a bus, wherein the read command indicates particular data, means for receiving the particular data from the unmanaged flash memory storage device via the bus, means for storing the particular data in a data buffer included in the host flash controller, and means for transmitting to the unmanaged flash memory storage device, via the bus, a write command to write the particular data.

In yet another example, an apparatus is disclosed. The apparatus may include, for example, a host processor, a host flash controller coupled to the host processor, and an unmanaged flash memory device communicating with the host flash controller via a bus, wherein the host flash controller comprises a flash memory controller data buffer, and a flash memory controller unit coupled to the flash memory controller data buffer, wherein the flash memory controller unit is configured to receive, at the host flash controller, a copy command from the host processor, in response to the copy command, transmit a read command to the unmanaged flash memory storage device via the bus, wherein the read command indicates particular data, receive the particular data from the unmanaged flash memory storage device via the bus, store the particular data in a data buffer included in the host flash controller, and transmit to the unmanaged flash memory storage device, via the bus, a write command to write the particular data

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the disclosure are disclosed in the following description and related drawings directed to specific aspects of the disclosure. Alternate aspects may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the invention" does not require that all aspects of the invention include the discussed feature, advantage or mode of operation.

Figure 1:
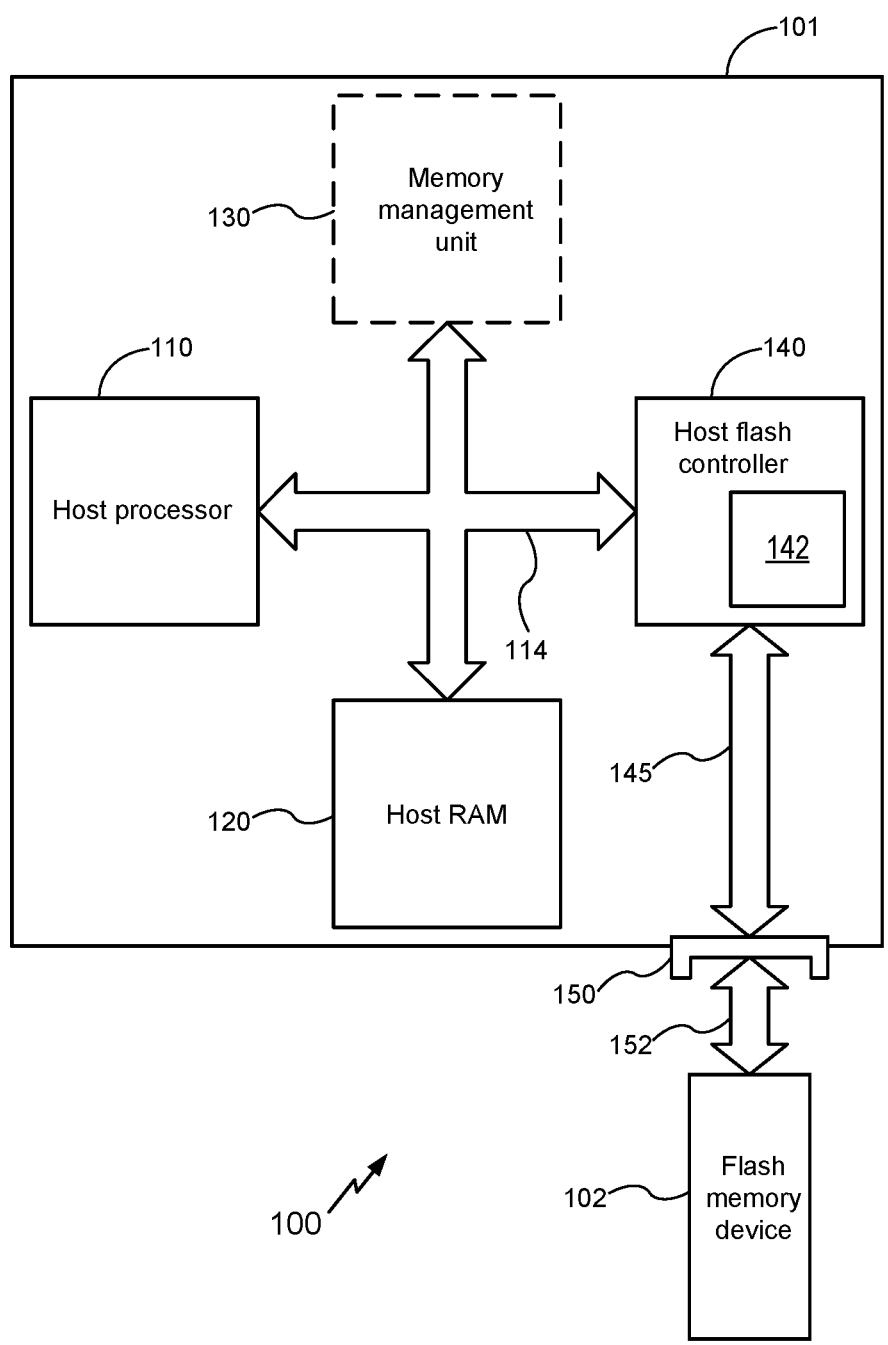
FIG. 1 generally illustrates a block diagram of a system 100 in accordance with aspects of the disclosure.

FIG. 1 generally illustrates a block diagram of a system 100 in accordance with aspects of the disclosure. The system 100 may include a host device 101 and a flash memory device 102. In some examples, the host device 101 and the flash memory device 102 are on separate dies connected by a bus 152.

The host device 101 may be a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, and a device in an automotive vehicle. The flash memory device 102 may be an unmanaged, external flash memory device. An unmanaged flash memory device may be a flash memory device that does not include a controller.

The host device 101 may include a host processor 110, a host RAM 120 (wherein RAM is an abbreviation for Random Access Memory), a host flash controller 140, and a data port 150. The host flash controller 140 may include a data buffer 142.

The host processor 110 and host flash controller 140 may be coupled via a processor interconnect 114. The host RAM 120 may also be coupled via the processor interconnect 114. The host flash controller 140 and the data port 150 may be coupled via a bus interconnect 145.

The system 100 may additionally include an optional memory management unit 130. The memory management unit 130 may be coupled to the host RAM 120 and the host flash controller 140 via the processor interconnect 114.

The data port 150 may be a physical data port. The data port 150 may be configured to physically complement the flash memory device 102, such that the flash memory device 102 can be securely fitted into the data port 150 (or vice-versa). The secure fitting permits a user of the host device 101 to physically connect and/or disconnect the flash memory device 102 from the host device 101.

When the flash memory device 102 is securely fitted to the host device 101, port electrical contacts in the data port 150 may be coupled to complementary flash memory device electrical contacts in the flash memory device 102. As a result, data and/or signals may be transmitted from the host flash controller 140 to the flash memory device 102 (and vice-versa).

As noted above, the flash memory device 102 may be an unmanaged flash memory device that does not include a controller. For example, individual flash memory die within the flash memory device 102 may include a chip-level controller, and the flash memory device 102 may not include a system-level controller that controls the flash memory device 102 as a whole. For example, the chip-level controller may control the I/O functions of the flash memory device 102 in accordance with the protocols (SPI, I2C, PCIe, etc.) presented above. The host flash controller 140 may be provided to perform the control signaling necessary to operate the flash memory device 102 and to handle the data that is transmitted to or received from the flash memory device 102.

Figure 2:
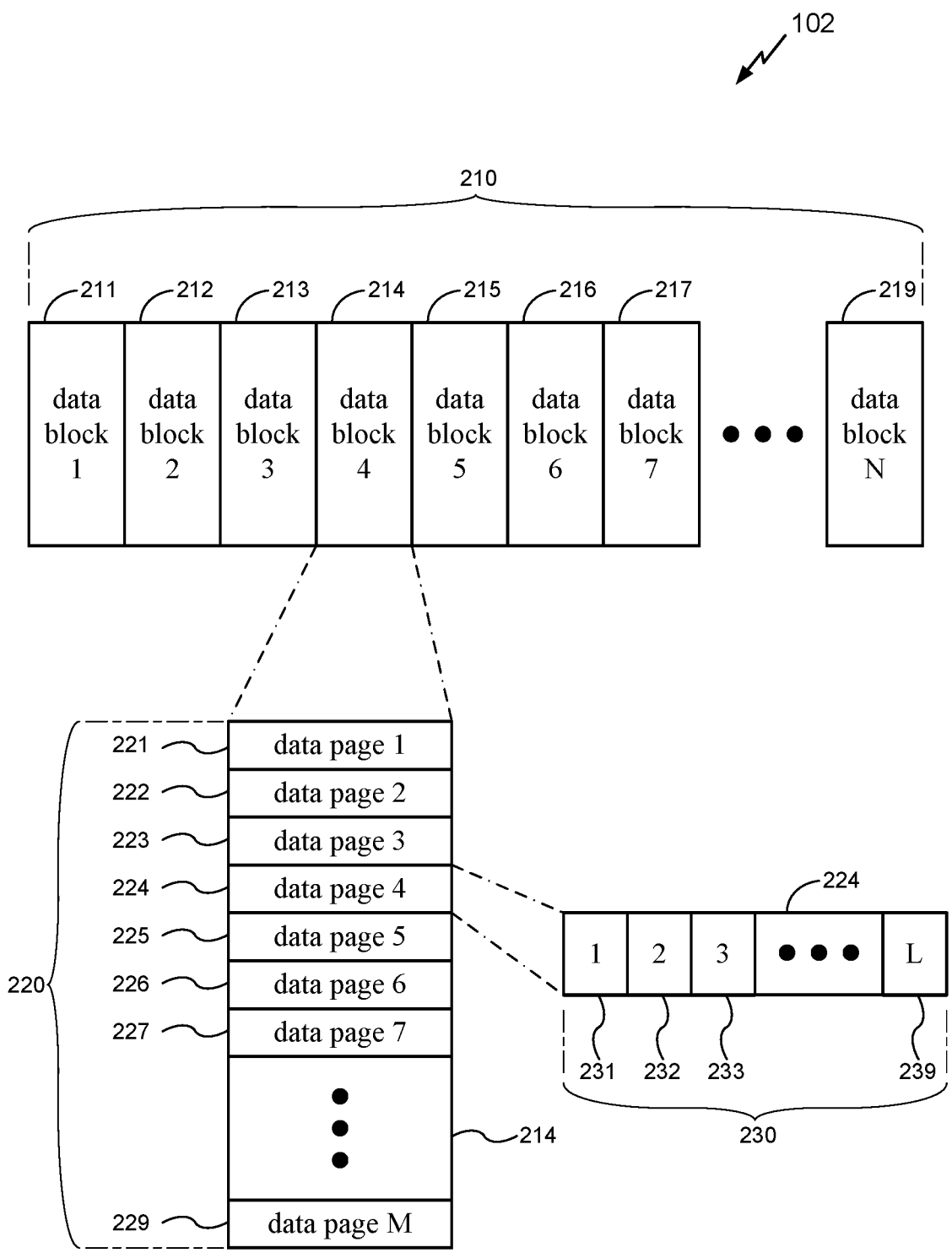
FIG. 2 generally illustrates a schematic diagram of an example flash memory device analogous to the flash memory device 102 depicted in FIG. 1.

FIG. 2 generally illustrates a schematic diagram of an example flash memory device analogous to the flash memory device 102 depicted in FIG. 1. As will be understood from the schematic diagram, the example flash memory device may include a plurality of data blocks 210. For illustrative purposes, FIG. 2 depicts a first data block 211, a second data block 212, a third data block 213, a fourth data block 214, a fifth data block 215, a sixth data block 216, a seventh data block 217, and an Nth data block 219. It will be understood that N may be any number, and that any corresponding number of data blocks may be disposed between the seventh data block 217 and the Nth data block 219.

Each of the plurality of data blocks 210 may include a plurality of data pages 220. For illustrative purposes, a detail of the fourth data block 214 is depicted in FIG. 2. In the detail, it can be observed that the plurality of data pages 220 may include a first data page 221, a second data page 222, a third data page 223, a fourth data page 224, a fifth data page 225, a sixth data page 226, a seventh data page 227, and a Mth data page 229. It will be understood that M may be any number, and that any corresponding number of data pages may be disposed between the seventh data page 227 and the Mth data page 229.

Each of the plurality of data pages 220 may include a plurality of gates 230. For illustrative purposes, a detail of the fourth data page 224 is depicted in FIG. 2. In the detail, it can be observed that the plurality of gates 230 may include a first gate 231, a second gate 232, a third gate 233, and an Lth gate 239. It will be understood that L may be any number, and that any corresponding number of gates may be disposed between the third gate 233 and the Lth gate 239.

As an example, a byte may include, for example, eight gates analogous to the gates 230. A codeword may include, for example, 512 bytes. Each data page may include, for example, 2048 bytes or 4096 bytes. Each block may include, for example, sixty-four data pages. It will be understood that these values are provided solely for illustrative purposes, and that the number of gates, bytes, codewords, or data pages may vary based on the technology, vendor, or model of the flash memory device 102.

Returning to FIG. 1, the host processor 110 may intermittently (for example, periodically) perform processes that require copying of data from the flash memory device 102. For example, the host processor 110 may intermittently perform a garbage collection process, a data refresh process, or some other process that requires copying of data.

In a garbage collection process, the host processor 110 instructs the system 100 to read valid data from one data block (for example, the fourth data block 214 depicted in FIG. 2) and write the valid data to another data block (for example, the Nth data block 219 depicted in FIG. 2). The generation of garbage will be explained, and then the details of the garbage collection process will be discussed in greater detail.

As an example, suppose that initial data is written to the first data page 221 of the fourth data block 214. Suppose that later, through some operation of the host processor 110, the initial data is to be updated to form updated data. As noted above, it may not be possible for a flash memory device 102 to overwrite an individual data page. Therefore, instead of overwriting the first data page 221 to include the updated data, the first data page 221 (having the initial data) is marked as garbage and the updated data is written to a free data page, for example, the fourth data page 224.

If the updated data is updated a second time, then the fourth data page 224 (having the updated data) will be marked as garbage and the twice-updated data will be written to another free data page, for example, the Mth data page 229. It will be understood that any data page marked as garbage (for example, the first data page 221 and the fourth data page 224 in the previous example) must be erased before it can be used to store new data. And, as noted above, a data block may be the smallest erasable unit. As a result, the first data page 221 and the fourth data page 224 can not be erased unless the entirety of the fourth data block 214 (each of the plurality of data pages 220) is erased. Accordingly, a garbage collection process is necessary for intermittent erasure of data blocks.

In the garbage collection process, valid data that is dispersed among one or more particular data blocks is consolidated by writing the valid data to a new data block. To return to the earlier example, the twice-updated data written to the Mth data page 229 may be marked as valid data, whereas the initial data written to the first data page 221 and the updated data written to the fourth data page 224 may be marked as garbage. Accordingly, the twice-updated data written to the Mth data page 229 may be written to a free data page in a different data block, for example, the Nth data block 219. Then, after the Mth data page 229 and any other valid data pages are copied to the Nth data block 219, the fourth data block 214 may be erased, freeing up each of the plurality of data pages 220 (including the first data page 221, the fourth data page 224, and the Mth data page 229).

In a data refresh process, the host processor 110 instructs the system 100 to read valid data from one data block (for example, the fourth data block 214 depicted in FIG. 2) and write the valid data to another data block (for example, the Nth data block 219 depicted in FIG. 2). The reasons for refreshing data will be explained, and then the details of the data refresh process will be discussed in greater detail.

As an example, suppose that initial data is written to the fourth data page 224 of the fourth data block 214. For example, a particular binary sequence may be written to each of the plurality of gates 230. The initial data stored in the fourth data page 224 may degrade over time. One reason that the initial data may degrade over time is referred to as data decay. Environmental conditions such as heat can, over time, cause an individual gate (for example, the second gate 232) to move toward a flip point. If the flip point is reached, a '1' may flip to a '0' (or vice-versa), and the data may become corrupted. Another reason that the initial data may degrade over time is referred to as read disturb. A read command of an adjacent data page (for example, the third data page 223 and/or the fifth data page 225) may stress the fourth data page 224, thereby causing one or more of the plurality of gates 230 to move toward the flip point.

In order to refresh the data, it must be intermittently written to a new data block. For example, the host processor 110 may determine that a refresh is necessary based on any number of factors, for example, a number of read commands, a temperature of the system 100, a passage of time, etc. The host processor 110 may then orchestrate the writing of old data blocks to new data blocks as part of the data refresh process.

Figure 3:
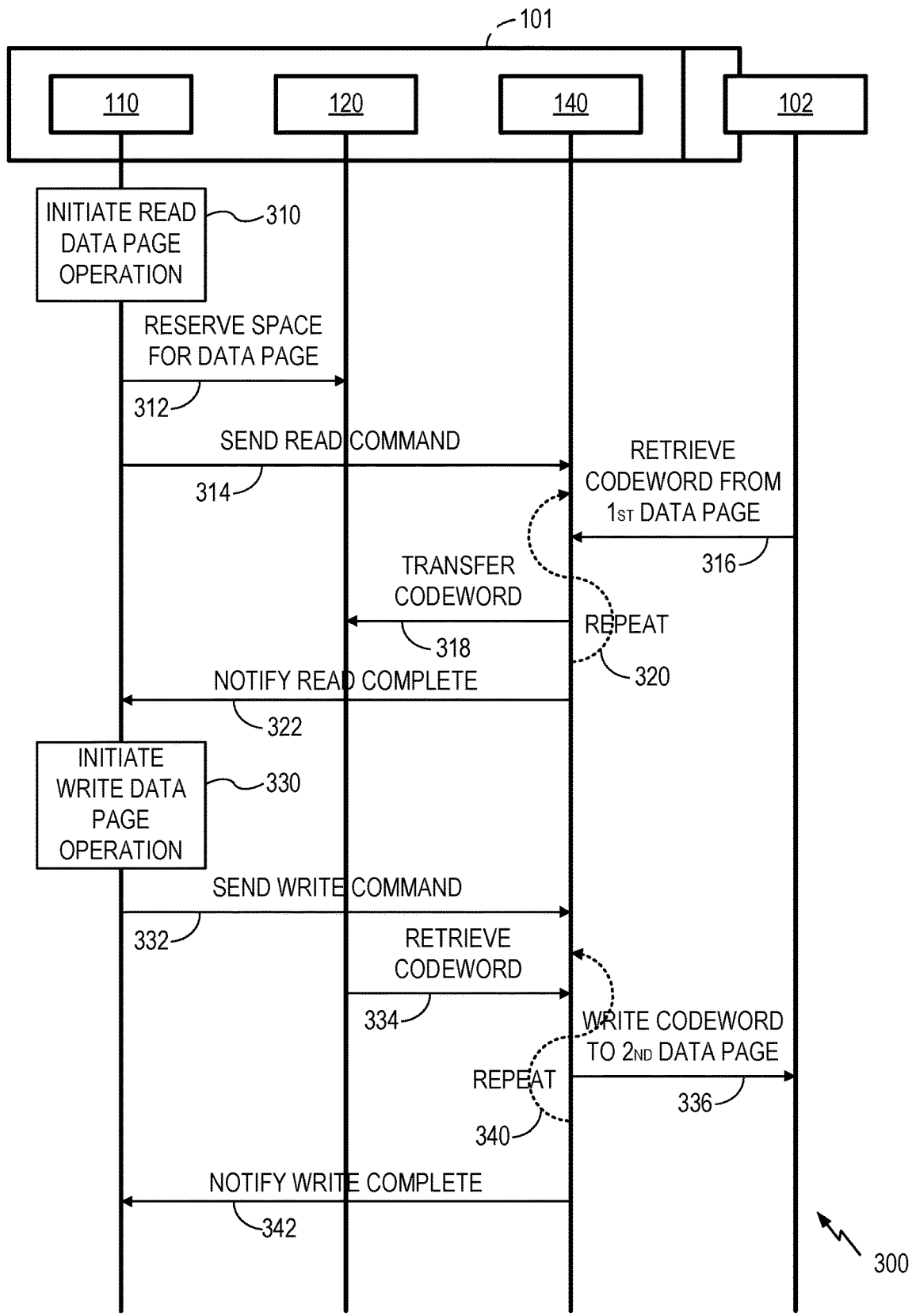
FIG. 3 generally illustrates a signal flow diagram reflecting a conventional approach for performing a copy operation of a data page.

FIG. 3 generally illustrates a signal flow diagram 300 reflecting a conventional approach for performing a copy operation of a data page. The copy operation may be included in a garbage collection process, a data refresh process, or any other process that requires copying of data pages. As will be discussed in greater detail below, if the host processor 110 were to perform a copy operation in accordance with the conventional approach depicted in FIG. 3, then the host processor 110 would first execute a read operation, and then execute a write operation.

At 310, the host processor 110 initiates a read data page operation. To perform the read data page operation, the host processor 110 may send commands to the host RAM 120 and/or the host flash controller 140, as will be discussed in greater detail below. The plurality of commands 312, 314, 316, 318, 320, 322 may be considered as elements of the read data page operation.

At 312, the host processor 110 sends a reserve space command to the host RAM 120. The reserve space command may set forth, for example, an index and an amount of space to be reserved.

At 314, the host processor 110 sends a read command to the host flash controller 140. The read command may identify particular data to be read and/or a location of the particular data.

At 316, in response to receipt of the read command at 314, the host flash controller 140 may determine a location of a codeword associated with the particular data and/or read the codeword from, for example, a first data page disposed in the flash memory device 102. Upon completion of the reading of the codeword, the codeword may be stored in the host flash controller 140 (or the data buffer 142 thereof).

At 318, the host flash controller 140 may transfer the codeword to the host RAM 120. Upon receipt of the codeword transferred at 318, the host RAM 120 may store the codeword in the space that was reserved at 312 (or a portion thereof).

At 320, the receiving at 316 and the transferring at 318 are repeated until each codeword associated with the first data page has been received and transferred. Conventionally, the data buffer 142 has a data storage capacity equal to one codeword.

At 322, the host flash controller 140 may notify the host processor 110 that the read operation initiated at 310 is complete.

At 330, the host processor 110 initiates a write data page operation. The initiating at 330 may be responsive to the notification 322. To perform the write data page operation, the host processor 110 may send commands to the host RAM 120 and/or the host flash controller 140, as will be discussed in greater detail below. The plurality of commands 332, 334, 336, 340, 342 may be considered as elements of the write data page operation.

At 332, the host processor 110 sends a write command to the host flash controller 140. The write command may identify the particular data stored at the host RAM 120.

At 334, in response to the receipt of the write command at 332, the host flash controller 140 may retrieve the particular data identified in the write command, or a portion thereof (for example, a codeword), from the host RAM 120. The retrieval may be orchestrated by the host flash controller 140 and the codeword may be stored in the data buffer 142.

At 336, the host flash controller 140 writes the codeword stored at the host flash controller 140 (or the data buffer 142 thereof) to the flash memory device 102. As noted above in the above descriptions of the garbage collection process and the data refresh process, the codeword may be written to a different data block than the data block from which the codeword was read.

At 340, the retrieving at 334 and the writing at 336 are repeated until each codeword associated with the first data page has been retrieved from the host RAM 120 and written to the second data page of the flash memory device 102.

At 342, the host flash controller 140 may notify the host processor 110 that the write operation initiated at 330 is complete.

As will be understood from the foregoing, the host processor 110 may instruct the system 100 to copy data for any number of reasons. However, as will be understood from FIG. 3, the process of copying requires that the host processor 110 perform a plurality of processing tasks. The process of copying also consumes space in the host RAM 120.

Figure 4:
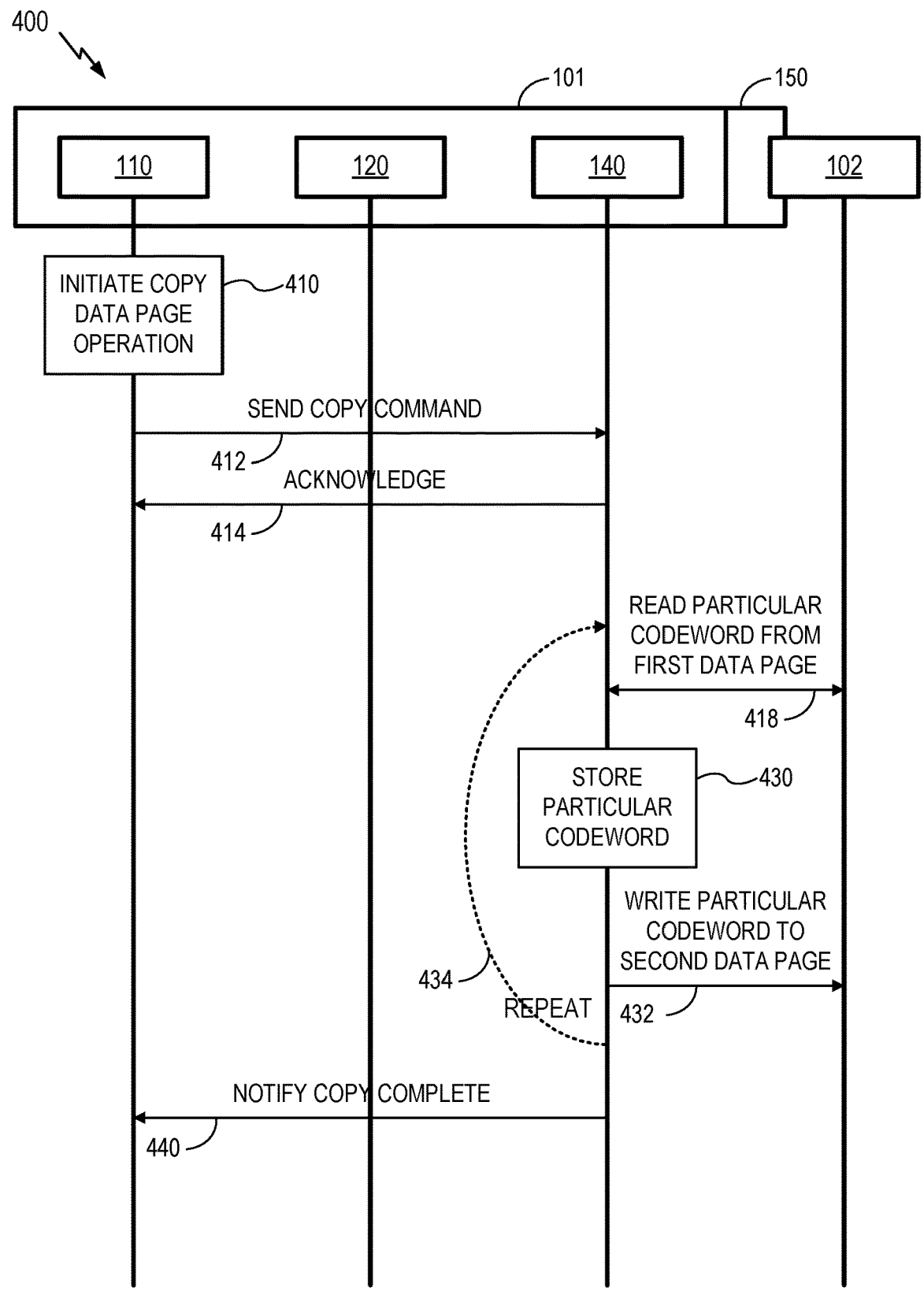
FIG. 4 generally illustrates a signal flow diagram for performing a copy operation in accordance with aspects of the disclosure.

FIG. 4 generally illustrates a signal flow diagram 400 for performing a copy operation in accordance with aspects of the disclosure. The copy operation may be a necessary step in a garbage collection process, data refresh process, or any other scheme, as described above. By contrast to the conventional approach depicted in FIG. 3, the copy operation depicted in FIG. 4 requires that the host processor 110 perform fewer processing tasks and consumes less space in the host RAM 120.

At 410, the host processor 110 initiates a copy data page operation. The initiating at 410 may be included in and/or responsive to a garbage collection process, a data refresh process, or any other process that requires the copying of data from one portion of the flash memory device 102 to another.

At 412, the host processor 110 sends a copy command to the host flash controller 140. The copy command 412 may include a plurality of information elements (IEs), including a command IE identifying the signal as a copy command (for example, "copy command start"), a source IE indicating the location or identity of particular data in the flash memory device 102 (for example, "source data page address"), an index IE indicating a quantity and/or length of data to be copied, a destination IE indicating the location or identity of a copy destination (for example, "destination data page address"), or any combination thereof.

By contrast to the conventional approach depicted in FIG. 3, it is unnecessary, in the copy operation of FIG. 4, to send multiple commands to the host RAM 120 and/or the host flash controller 140 (for example, the reserve space command 312, the read command 314, the write command 332, etc.). Instead, a single copy command is sent at 412.

At 414, the host flash controller 140 may optionally acknowledge receipt of the copy command 412. The acknowledge 414 may be responsive to receipt of the copy command 412 from the host processor 110.

At 418, the host flash controller 140 may read the particular codeword indicated in the copy command 412. The particular codeword may be a portion of the data in a particular data page (referred to herein as a "first data page"). The first data page may be analogous to any of the plurality of data pages 220 depicted in FIG. 2. The first data page may be located in a first data block analogous to any of the plurality of data blocks 210 depicted in FIG. 2. The particular codeword may be received via the data port 150 from the flash memory device 102.

At 430, the host flash controller 140 may store the particular data received at 418. The host flash controller 140 may store the particular data in the data buffer 142. In this implementation, the data buffer 142 has a data capacity of one codeword, similar to conventional approaches.

At 432, the host flash controller 140 may write the particular codeword received at 418 and stored at 430 to the flash memory device 102.

At 434, the receiving at 318, the storing at 430, and the writing at 432 are optionally repeated until each codeword associated with the first data page has been written to the second data page of the flash memory device 102.

At 440, the host flash controller 140 may notify the host processor 110 that the copy operation initiated at 410 is complete.

Figure 5:
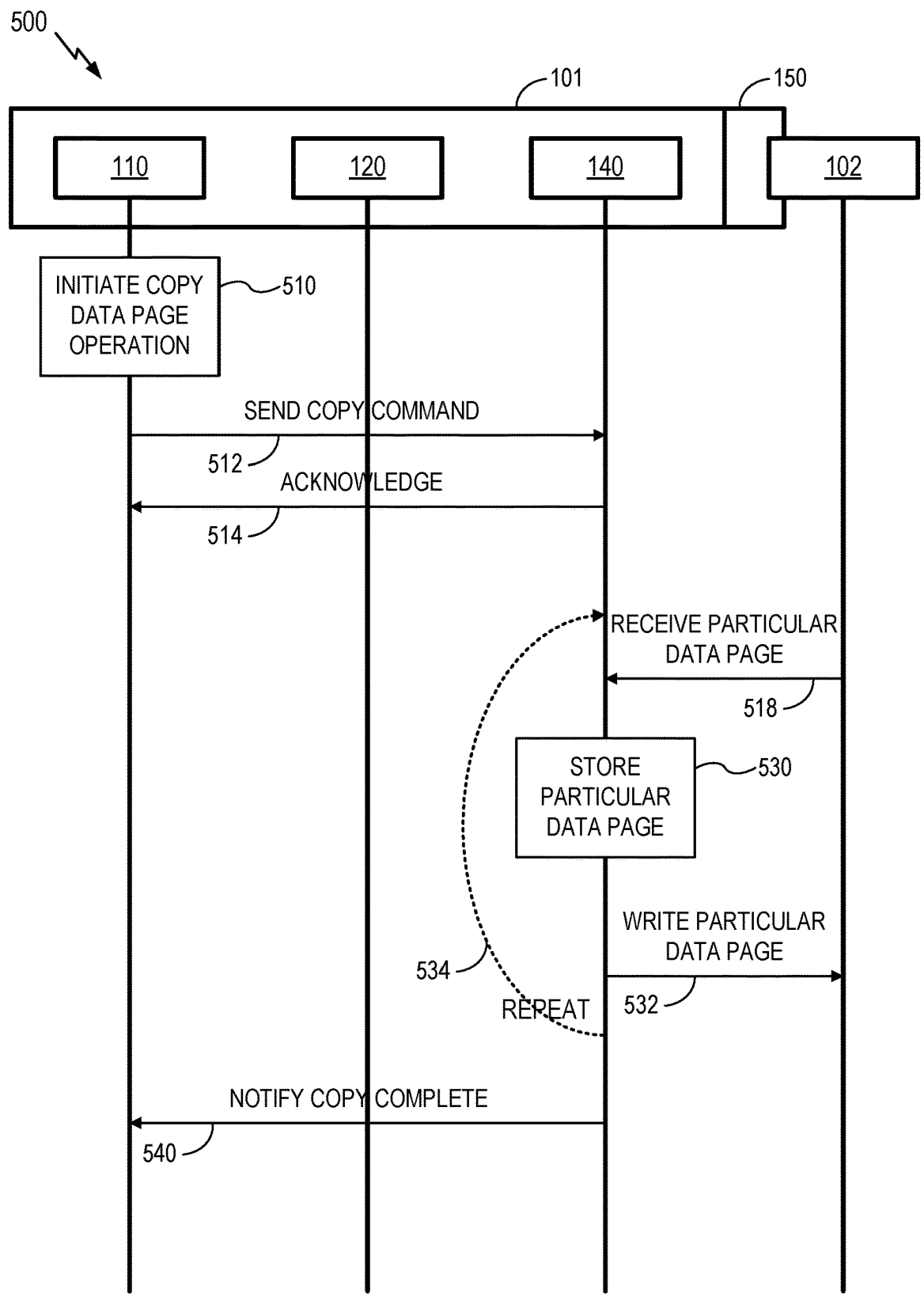
FIG. 5 generally illustrates a signal flow diagram for performing a copy operation in accordance with other aspects of the disclosure.

FIG. 5 generally illustrates a signal flow diagram 500 for performing a copy operation in accordance with aspects of the disclosure. The copy operation may be a necessary step in a garbage collection process or data refresh process, as described above. By contrast to the conventional approach depicted in FIG. 3, the copy operation depicted in FIG. 5 requires that the host processor 110 perform fewer processing tasks and consumes less space in the host RAM 120. By contrast to the copy operation depicted in FIG. 4, the copy operation depicted in FIG. 5 uses a data buffer 142 having a data capacity that is greater than one codeword. This may improve the speed and efficiency of the copy operation.

At 510, the host processor 110 initiates a copy data page operation. The initiating at 510 may be included in and/or responsive to a garbage collection process, a data refresh process, or any other process that requires the copying of data from one portion of the flash memory device 102 to another. The initiating at 510 may be analogous to the initiating at 410 depicted in FIG. 4.

At 512, the host processor 110 sends a copy command to the host flash controller 140. The copy command 512 may include a plurality of information elements (IEs), including a command IE identifying the signal as a copy command, a source IE indicating the location or identity of particular data in the flash memory device 102, an index IE indicating a quantity of data to be copied, a destination IE indicating the location or identity of a copy destination, or any combination thereof. The sending at 512 may be analogous to the sending at 412 depicted in FIG. 4.

By contrast to the conventional approach depicted in FIG. 3, it is unnecessary, in the copy operation of FIG. 5, to send multiple commands to the host RAM 120 and/or the host flash controller 140 (for example, the reserve space command 312, the read command 314, the write command 332, etc.). Instead, a single copy command is sent at 512.

At 514, the host flash controller 140 may optionally acknowledge receipt of the copy command 512. The acknowledge 514 may be responsive to receipt of the copy command 512 from the host processor 110. The optional acknowledgement at 514 may be analogous to the optional acknowledgement at 414 depicted in FIG. 4.

At 518, the host flash controller 140 may receive the particular data page indicated in the copy command 512. The particular data page may be referred to herein as a "first data page", and may be disposed in a first data block. The first data page may be analogous to any of the plurality of data pages 220 depicted in FIG. 2. The first data block may be analogous to any of the plurality of data blocks 210 depicted in FIG. 2. The particular data page may be received via the data port 150 from the flash memory device 102.

At 530, the host flash controller 140 may store the particular data page received at 518. The host flash controller 140 may store the particular data page in the data buffer 142. In this implementation, the data buffer 142 has a data capacity of one data page, by contrast to conventional approaches, in which the data buffer 142 has a data capacity of one codeword. Accordingly, the storing at 530 may include storing each of a plurality of data codewords such that the data buffer simultaneously includes each of the plurality of data codewords.

At 532, the host flash controller 140 may write the particular data page received at 518 and stored at 530 to the flash memory device 102. In some implementations, the data page may written at 532 to a different data block than the data block from which the data page was received at 518. For example, the particular data page may be received at 518 from a first data block and written at 532 to a second data block.

At 540, the host flash controller 140 may notify the host processor 110 that the copy operation initiated at 510 is complete.

The tasks or processes depicted in FIGS. 4-5, or any other tasks or processes in the present disclosure, may be implemented using any suitable means. Such means also may be implemented, at least in part, using corresponding structure as taught herein. For example, the host flash controller 140 may constitute means for receiving, at the host flash controller, a copy command from a host processor. The host flash controller 140 may further constitute means for transmitting, in response to the copy command, a read command to the unmanaged flash memory storage device via a bus, wherein the read command indicates particular data. The host flash controller 140 may further constitute means for receiving the particular data from the unmanaged flash memory storage device via the bus. The host flash controller 140 may further constitute means for storing the particular data in a data buffer included in the host flash controller. The host flash controller 140 may further constitute means for transmitting to the unmanaged flash memory storage device, via the bus, a write command to write the particular data.

While the foregoing disclosure shows illustrative aspects of the disclosure, it should be noted that various changes and modifications could be made herein without departing from the scope of the invention as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for copying data in an unmanaged flash memory storage device using a host flash controller, comprising:
    receiving, at the host flash controller, a copy command from a host processor coupled to the host flash controller, the host processor and the host flash controller being parts of a host device;
    in response to the copy command, transmitting, from the host flash controller, a read command to the unmanaged flash memory storage device via a bus, wherein the read command indicates particular data in the unmanaged flash memory storage device connected to a data port of the host device, the unmanaged flash memory storage device not having a controller that controls the unmanaged flash memory storage device as a whole;
    receiving, at the host flash controller, the particular data from the unmanaged flash memory storage device via the bus;
    storing the particular data in a data buffer included in the host flash controller; and
    transmitting, from the host flash controller to the unmanaged flash memory storage device, via the bus, a write command to write the particular data into the unmanaged flash memory storage device.

2. The method of claim 1, wherein the unmanaged flash memory storage device includes a plurality of NAND logic gates and/or a plurality of NOR logic gates.

3. The method of claim 1, wherein:
    the particular data is a data page, the data page including a plurality of data codewords; and
    the storing of the particular data in the data buffer includes storing each of the plurality of data codewords such that the data buffer simultaneously includes each of the plurality of data codewords.

4. The method of claim 1, wherein the copy command identifies a source start data page, a destination start data page, a length of the particular data, or any combination thereof.

5. The method of claim 1, further comprising:
    transmitting an acknowledgement from the host flash controller to the host processor in response to the receiving of the copy command.

6. The method of claim 1, wherein the read command indicates a read address of the particular data.

7. The method of claim 1, wherein the write command include the particular data and indicates a write address.

8. The method of claim 1, further comprising:
    after transmitting of the write command, transmitting a copy complete notification to the host processor.

9. The method of claim 1, further comprising:
    incorporating the host processor, the host flash controller, and the bus into the host device; and
    incorporating a host random access memory into the host device, wherein the host random access memory is coupled to the host processor and the host flash controller.

10. The method of claim 1, further comprising incorporating the host flash controller into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, and a device in an automotive vehicle.

11. A host flash controller, comprising:
    a flash memory controller data buffer; and
    a flash memory controller unit coupled to the flash memory controller data buffer,
    wherein the flash memory controller unit is configured to:
        receive, at the host flash controller, a copy command from a host processor coupled to the host flash controller, the host processor and the host flash controller being parts of a host device;
        in response to the copy command, transmit, from the host flash controller, a read command to an unmanaged flash memory storage device via a bus, wherein the read command indicates particular data in the unmanaged flash memory storage device connected to a data port of the host device, the unmanaged flash memory storage device not having a controller that controls the unmanaged flash memory storage device as a whole;

receive, at the host flash controller, the particular data from the unmanaged flash memory storage device via the bus;

store the particular data in a data buffer included in the host flash controller; and transmit, from the host flash controller to the unmanaged flash memory storage device, via the bus, a write command to write the particular data into the unmanaged flash memory storage device.

12. The host flash controller of claim 11, wherein the unmanaged flash memory storage device includes a plurality of NAND logic gates and/or a plurality of NOR logic gates.

13. The host flash controller of claim 11, wherein:
the particular data is a data page, the data page including a plurality of data codewords; and
the flash memory controller unit is further configured to store each of the plurality of data codewords such that the data buffer simultaneously includes each of the plurality of data codewords.

14. The host flash controller of claim 11, wherein the copy command identifies a source start data page, a destination start data page, a length of the particular data, or any combination thereof.

15. The host flash controller of claim 11, wherein the flash memory controller unit is further configured to:
transmit an acknowledgement from the host flash controller to the host processor in response to the receiving of the copy command.

16. The host flash controller of claim 11, wherein the read command indicates a read address of the particular data.

17. The host flash controller of claim 11, wherein the write command include the particular data and indicates a write address.

18. The host flash controller of claim 11, wherein the flash memory controller unit is further configured to:
after transmitting of the write command, transmit a copy complete notification to the host processor.

19. The host flash controller of claim 11, wherein the host flash controller and the host processor are incorporated into the host device; and
a host random access memory is also incorporated into the host device, wherein the host random access memory is coupled to the host processor and the host flash controller.

20. The host flash controller of claim 11, wherein the host flash controller is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, and a device in an automotive vehicle.

21. A flash memory controller apparatus, comprising:
means for receiving, at a host flash controller, a copy command from a host processor coupled to the host flash controller, the host processor and the host flash controller being parts of a host device;
means for transmitting, from the host flash controller in response to the copy command, a read command to an unmanaged flash memory storage device via a bus, wherein the read command indicates particular data in the unmanaged flash memory storage device connected to a data port of the host device, the unmanaged flash memory storage device not having a controller that controls the unmanaged flash memory storage device as a whole;

means for receiving, at the host flash controller, the particular data from the unmanaged flash memory storage device via the bus;

means for storing the particular data in a data buffer included in the host flash controller; and means for transmitting, from the host flash controller to the unmanaged flash memory storage device, via the bus, a write command to write the particular data into the unmanaged flash memory storage device.

22. The flash memory controller apparatus of claim 21, wherein the unmanaged flash memory storage device includes a plurality of NAND logic gates and/or a plurality of NOR logic gates.

23. The flash memory controller apparatus of claim 21, wherein:
the particular data is a data page, the data page including a plurality of data codewords; and
means for storing the particular data in the data buffer includes means for storing each of the plurality of data codewords such that the data buffer simultaneously includes each of the plurality of data codewords.

24. The flash memory controller apparatus of claim 21, wherein the flash memory controller apparatus and the host processor are incorporated into the host device; and
a host random access memory is also incorporated into the host device, wherein the host random access memory is coupled to the host processor and the flash memory controller apparatus.

25. The flash memory controller apparatus of claim 21, wherein the host flash controller is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, and a device in an automotive vehicle.

26. An apparatus, comprising:
a host processor;
a host flash controller coupled to the host processor, the host processor and the host flash controller being parts of a host device; and
an unmanaged flash memory storage device communicating with the host flash controller via a bus, the unmanaged flash memory storage device being connected to a data port of the host device and not having a controller that controls the unmanaged flash memory storage device as a whole;
wherein the host flash controller comprises:
a flash memory controller data buffer; and
a flash memory controller unit coupled to the flash memory controller data buffer,
wherein the flash memory controller unit is configured to:
receive, at the host flash controller, a copy command from the host processor;
in response to the copy command, transmit, from the host flash controller, a read command to the unmanaged flash memory storage device via the bus, wherein the read command indicates particular data in the unmanaged flash memory storage device;
receive, at the host flash controller, the particular data from the unmanaged flash memory storage device via the bus;

store the particular data in a data buffer included in the host flash controller; and transmit, from the host flash controller to the unmanaged flash memory storage device, via the bus, a write command to write the particular data into the unmanaged flash memory storage device.

27. The apparatus of claim 26, wherein the unmanaged flash memory storage device includes a plurality of NAND logic gates and/or a plurality of NOR logic gates.

28. The apparatus of claim 26, wherein:
the particular data is a data page, the data page including a plurality of data codewords; and
the flash memory controller unit is further configured to store each of the plurality of data codewords such that the data buffer simultaneously includes each of the plurality of data codewords.

29. The apparatus of claim 26, further comprising:
a host random access memory, wherein the host random access memory is coupled to the host processor and the host flash controller.

30. The apparatus of claim 26, wherein the apparatus is a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, and a device in an automotive vehicle.

* * * * *